J. TAYLOR.
Hay-Tedders.

No. 151,805. Patented June 9, 1874.

WITNESSES:
A.W. Almqvist
Sedgwick

INVENTOR:
J. Taylor
BY
Munn & Co
ATTORNEYS.

UNITED STATES PATENT OFFICE.

JAMES TAYLOR, OF DE KALB JUNCTION, NEW YORK.

IMPROVEMENT IN HAY-TEDDERS.

Specification forming part of Letters Patent No. 151,805, dated June 9, 1874; application filed February 28, 1874.

*To all whom it may concern:*

Figure 1:
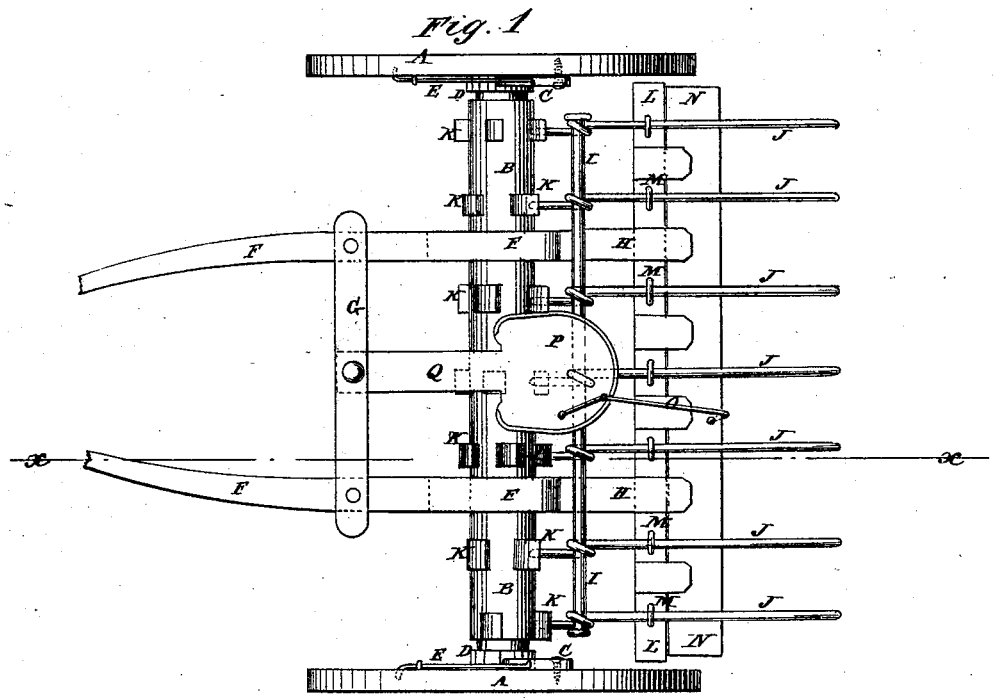
Figure 2:
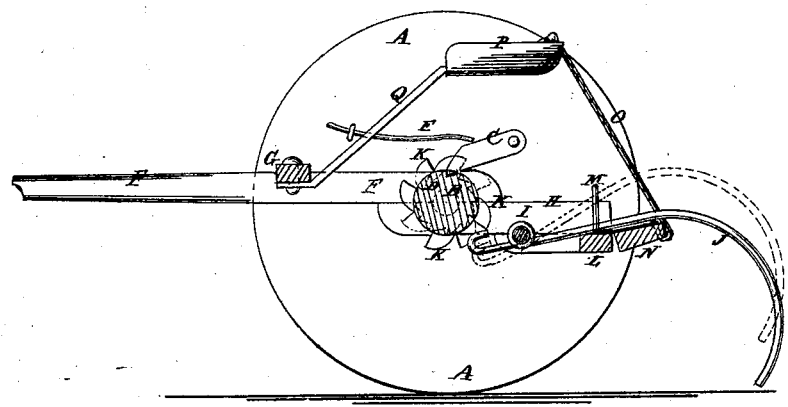

Be it known that I, JAMES TAYLOR, of De Kalb Junction, in the county of St. Lawrence and State of New York, have invented a new and useful Improvement in Hay-Tedder, of which the following is a specification:

Fig. 1 is a top view of my improved hay-tedder. Fig. 2 is a transverse section of the same, taken through the line $x\ x$, Fig. 1.

Similar letters of reference indicate corresponding parts.

The invention will first be fully described, and then pointed out in the claim.

A are the wheels, which are placed upon the journals of the axle B, and are made to carry said axle with them in their revolution as they revolve forward by the pawls C, which are pivoted to said wheels, and take hold of the ratchet-wheels D attached to or formed upon said axle B. The pawls C are held against the ratchet-wheels D by the springs E, attached to said wheels A, and which press against said pawls C. F are the shafts, which are connected and held in their proper relative positions by a cross-bar, G. The rear ends of the shafts F rest upon journals formed upon the axle B, and in their lower sides are formed half-round notches, to serve as half-bearings for said journals, the other half-bearings being formed in the upper side of the forward ends of the blocks or arms H, bolted to the lower side of the rear ends of the said shafts F. To the arms H is secured a rod, I, which passes through a coil formed in the wire teeth J, near their forward ends, and serves as a fulcrum to said teeth. The teeth J are similar to wire rake-teeth, and they are kept in proper relative position upon said rod by tubular washers of the proper length placed upon the said rod between the said teeth. The forward ends of the teeth J project nearly to the axle B, so as to be struck by the projections or cams K formed upon or attached to the said axle B, and raised to drop the hay caught by them. The cams K are so arranged upon the axle B that the teeth will not be operated in consecutive order, and that but one or two of them will be operated at the same time. To the rear parts of the arms H is attached a cross-bar, L, to which are attached long staples or guides, M, through which the teeth J pass, and by which said teeth are made to move up and down in vertical lines. To the rear edge of the cross-bar L is hinged the forward edge of a board, N, to the rear edge of which is attached a cord, O, which extends up to the driver's seat P, and is secured by being inserted in a slit in the said driver's seat P, or by some other convenient holder, so that by pulling upon the said cord O the rear edge of the board N may be raised to raise the teeth J from the ground when desired. The driver's seat P is attached to the upper end of a standard, Q, the lower end of which inclines forward and is attached to the cross-bar G of the shafts F.

Having thus described my invention, I claim as new and desire to secure by Letters Patent—

The combination, with the series of axle-cams K, of separately-pivoted teeth J having projecting shanks, as and for the purpose specified.

JAMES TAYLOR.

Witnesses:
   M. K. BALWIN,
   H. D. MOODY.